United States Patent [19]
Benford, deceased et al.

[11] Patent Number: 5,243,248
[45] Date of Patent: Sep. 7, 1993

[54] ELECTRIC MOTOR HAVING A LOW LOSS MAGNETIC FLUX RETURN PATH

[76] Inventors: Susan M. Benford, deceased, late of Rocky River, Ohio; by Daniel J. Shramo, executor, 800 Brick Mill Run, Apt. 419, Westlake, Ohio 44145

[21] Appl. No.: 859,589

[22] Filed: Mar. 30, 1992

Related U.S. Application Data

[63] Continuation-in-part of Ser. No. 453,616, Dec. 20, 1989.

[51] Int. Cl.⁵ .................. H02K 1/12; H02K 15/00
[52] U.S. Cl. ................................ 310/256; 310/42; 310/254; 310/259
[58] Field of Search .............. 310/42, 216, 217, 218, 310/254, 256, 259, 258; 336/177, 234, 213; 29/605, 606

[56] References Cited

U.S. PATENT DOCUMENTS

| | | | |
|---|---|---|---|
| 847,088 | 3/1907 | Kitsee | 336/177 |
| 2,277,474 | 3/1942 | Bergtold | 336/177 |
| 3,956,651 | 5/1976 | Brammerlo | 310/218 |
| 3,983,433 | 9/1976 | Sims | 310/254 |
| 3,983,435 | 9/1976 | Sims | 310/259 |

Primary Examiner—Leo P. Picard
Assistant Examiner—Ramon Barrera
Attorney, Agent, or Firm—Oldham, Oldham & Wilson Co.

[57] ABSTRACT

The invention is directed to an electric motor construction having a magnetic flux return path which exhibits very low losses due to eddy currents or hysteresis, and simplifies construction thereof. In the motor construction, the magnetic flux return path is constructed from discrete magnetic material wire which is wrapped or otherwise formed in the desired return path configuration. The magnetic material wire is wound in a direction which generally crosses the flow of magnetic flux and yet is substantially tolerant of cross-winding fields. In this way, the flux return path provides easy construction in that coil winding techniques may be used, and the winding direction is less critical as it can cross the flow of flux therein. The flux return path greatly reduces eddy current losses as the cross section of the path to eddy current flow is the cross section of discrete wires, and because the discrete wires are formed with high packing fraction which will minimize skin effects especially at high frequencies.

17 Claims, 2 Drawing Sheets

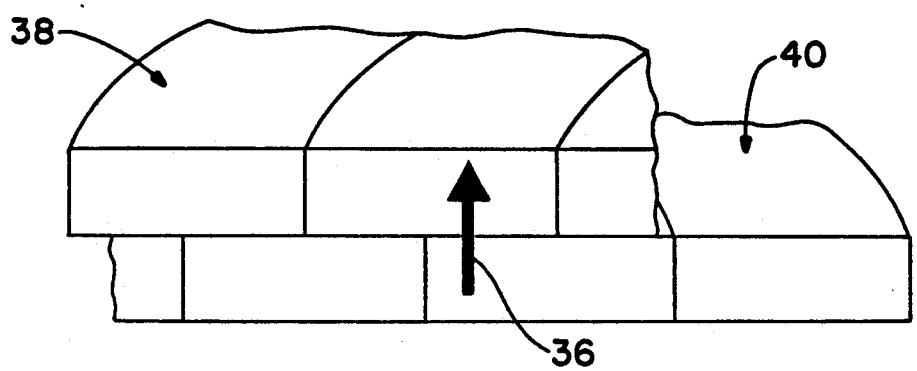
FIG.-4
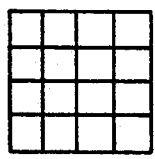 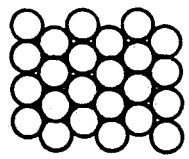 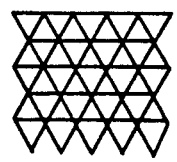 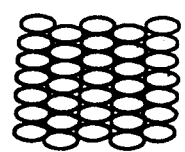 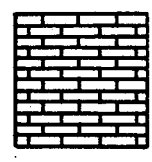
FIG.-5A    FIG.-5B    FIG.-5C    FIG.-5D    FIG.-5E

ELECTRIC MOTOR HAVING A LOW LOSS MAGNETIC FLUX RETURN PATH

This is a Continuation-in-Part application based on the copending application Ser. No. 07/453,616 filed on Dec. 20, 1989.

BACKGROUND OF THE INVENTION

The invention is generally directed to electric motors in which fluctuating magnetic fields are used to produce force, work, torque or the like, and which include a magnetic flux return path. More particularly, the invention is directed to a novel electric motor design which allows more efficient operation and which includes a magnetic flux return path with very low loss and an extremely flexible design.

Electric motors are generally constructed with a rotor having permanent magnets thereon which produce a rotating magnetic field as the permanent magnets are rotated. The rotor may include a fixed magnetic flux return path, and is rotationally supported within a stator assembly. The stator assembly generally will comprise field windings which are energized to produce rotation of the rotor by means of the permanent magnets situated thereon. A magnetic flux return path situated about the field windings of the stator assembly completes a magnetic circuit for the flow of magnetic flux generated. In such a motor construction, the fluctuating magnetic fields produced by rotational movement of the permanent magnets associated with the rotor may lead to losses associated with eddy currents and hysteresis. For example, if the magnetic flux return path of the motor is such that magnetic saturation occurs, hysteresis losses may also be induced. In such motors, where fluctuating magnetic fields are utilized to produce torque and power in an output shaft, the magnetic flux is directed from one magnetic pole to the other magnetic pole of a permanent magnet found on a rotor through the flux return paths. As the magnetic field within the flux return path varies due to rotation of the permanent magnets, losses may be induced.

In motors using high frequency alternating currents, both eddy current losses and hysteresis losses become greater due to the greater flux density within the magnetic material of the flux return path. Additionally, with high frequency applications, skin effects and magnetic saturation become of greater concern. Both eddy current and hysteresis losses generate heat which presents a major design problem for the motor construction. To minimize hysteresis losses, previous applications have resorted to increasing the thickness of the flux return path to avoid magnetic saturation of the material.

Previous flux return path designs have also attempted to minimize eddy current losses by constructing the magnetic flux return of laminations or a number of thin iron plates which are insulated from one another. At low frequencies, eddy current losses are a function of the thickness of the laminations making up the core and flux return path of the motor. Similarly, at high frequencies, both eddy current losses and hysteresis losses may be dependent upon the thickness of the laminations due to skin penetration effects. Thus, in the design of the magnetic circuit in such motors, losses are generally minimized by providing a thick flux return path thereby avoiding saturation of the iron material normally used in their construction. The flux return path is made of a number of thin laminates from a material having a high magnetic permeability wherein very thin laminates are normally desirable. Unfortunately, the degree of thinness obtainable for the laminations is limited by construction and fabrication problems as well as by cost.

As an example, a slotless, brushless DC motor flux return path or backiron may be constructed of a plurality of laminations, designed to have a radial thickness of about 0.060 inches to accommodate a flux density which is limited to about 1.0 T. The flux density can be limited to 1.0 T when the rotor magnets have a flux density of about 0.4 T which is a typical value for high flux ceramic magnets. A backiron construction having the desired thickness may be constructed of multiple laminations having conventional thicknesses of about 0.014 to 0.025 inches. Thinner laminations are possible but add to the cost of fabrication. For a typical DC motor with an output of 50 watts at 20,000 RPM the backiron parameters conventionally employed are a stack length of 1.5 inches and a diameter of 2 inches. To form a radial thickness of about 0.060 inches, the backiron weight will be approximately 0.167 pounds which must be considered in the design of the motor. With a slotless brushless motor as described, the loss in the magnetic flux return path or backiron can be calculated as follows:

$$L_{BI} = afB_o^2 + b(tfB_o)^2 \qquad (2)$$

where $L_{BI}$ is the loss in the backiron in watts/kg, a and b are constants depending on the properties of the material, f equals the flux frequency in Hz., $B_0$ equals the flux density in the backiron in Tesla, and t equals lamination thickness in millimeters. In the equation for calculating the loss in the backiron as described above, the values of a and b will be known. For example, using an AISI grade M-15 iron laminate, which is typically used for such laminations, these constants will have values of $a=0.019$ and $b=6.2\times10^{-4}$. Flux saturation levels in most iron materials occurs at approximately 1.2 to 1.6 T and therefore saturation effects will not be considered in this example as the flux density has been limited to about 1.0 T. For a typical DC motor construction with the backiron as described above and an output of 50 watts at 20,000 RPM, the backiron stack length of 1.5 inches would require about 107 laminations which are about 0.014 inches in thickness or approximately 60 laminations if the thickness is about 0.025 inches. Cost considerations would require choosing between better performance characteristics for thinner laminations or less cost for the thicker laminations. The backiron loss, $L_{BI}$, for a construction using the lamination thickness of 0.025 inches with a radial length of about 0.060 inches for a 20,000 RPM, 2-pole pair motor calculates to a loss of about 80 watts which for a 50 watt output constitutes a 61.5% loss of the input power. It should be recognized that the loss calculated above is for eddy current losses and has assumed that no magnetic saturation occurs resulting in other losses. The loss due to eddy currents is significant in itself and must be considered in the design of the motor.

Thus, in electrical motors which utilize varying magnetic fields, the magnetic flux return path would desirably be designed to carry any expected magnetic fields in the device with lower loss. The expected magnetic fields therefore dictate the requirements of the magnetic flux return path as to the material permeability and geometry necessary to channel a fluctuating magnetic field with low losses.

SUMMARY OF THE INVENTION

Based upon the foregoing, there has been found a need to provide an electric motor construction having a magnetic flux return path which allows significant reduction of losses related to eddy currents or hysteresis to allow more efficient operation of the motor. There has also been found a need to provide a motor design having a magnetic flux return path which greatly minimizes losses and provides ease of construction thereby enabling higher operating efficiency and lower manufacturing costs.

It is therefore a main object of the invention to provide an electric motor construction having a magnetic flux return path which greatly minimizes losses occurring due to eddy currents and hysteresis.

It is a further object of the invention to provide an electric motor having a magnetic flux return path which greatly minimizes eddy current losses and hysteresis losses over a broad frequency spectrum, and allows standard coil winging techniques to be used in its construction, wherein the magnetic material wire used in the construction may be wound in a direction which generally crosses the flow of magnetic flux generated by the permanent magnet rotor assembly.

Another object of the invention is to provide a novel design for an electric motor which is simple and cost effective to manufacture.

It is a further object of the invention to provide an electric motor having a magnetic flux return path which can be designed to carry expected magnetic fields with less strict requirements on material permeability and geometry wherein the flux return path is tolerant to cross-winding and cross-layer magnetic fields.

These and other objects of the invention are accomplished by a motor construction having a magnetic circuit which includes a low loss magnetic flux return path comprising of a plurality of discrete windings of magnetic material wire wound in a direction which generally crosses the flow of magnetic flux generated by the permanent magnet rotor assembly motor. The flux return path minimizes losses due to eddy currents or hysteresis because of the smaller cross section of wire to eddy currents and because of the minimization of skin effects associated with high frequencies and harmonics. The windings of magnetic material wire will preferably comprise high permeability material wire to form the low loss magnetic circuit. Eddy currents within the magnetic flux return path are then carried by the individual wires in the layers forming the flux return path. In this way, the cross section to eddy currents become the cross section of the wire, rather than a laminate edge as in conventional constructions, thereby reducing resistive losses and skin effects. To minimize eddy current losses, the magnetic material wire is adapted to be wound with a high packing fraction sufficient to result in the flux return path being tolerant to cross-layer and cross-winding magnetic fields. In this way, the magnetic material wire forming the magnetic flux return path may be wound in a direction generally crossing the flow of magnetic flux generated by the rotation of the permanent magnet rotor. Such a configuration is contrary to the design parameters used under conventional theory regarding the construction of a flux return path. In conventional motor design, it has been thought that the flux return path must have its long dimension in the direction of the flow of magnetic flux. Contrary to this, the flux return path 26 crosses the flow of flux, but has been found to be substantially tolerant to cross-winding fields.

In construction of the flux return path, the ability to wind the magnetic material wire in a direction which crosses the flow of flux allows coil winding techniques to be used. Additionally, the high magnetic permeability wire windings can be formed of smaller dimensional wire to allow for a higher packing fraction which will further reduce eddy current losses and hysteresis losses over a broad frequency spectrum. The windings of magnetic material wire can be constructed of any wire geometry as, for example square, flat, round, oval, triangular or other desirable cross sections to allow various packing characteristics in the layers for different applications. The magnetic flux return path may be thus formed from a low cost material and provide great flexibility in fabrication and manufacturing.

The motor and magnetic flux return path of the invention provides very low eddy current losses and hysteresis losses over a broad frequency spectrum, and especially at higher frequencies. Additionally, the flux return path allows higher efficiency operation at a lower manufacturing cost. The high packing fraction of the magnetic material wire enables winding of the magnetic material wire crossing the flow of magnetic flux in that the construction of the flux return path will be substantially tolerant to cross-layer and cross-winding fields. The use of such a flux return path also minimizes eddy current losses as the cross-section to eddy currents will be the individual cross-sections of the windings of magnetic material wire. The increased efficiency and cost effective manufacturing of the construction greatly enhance utilization of the motor, and allow very high frequency applications to be achieved.

BRIEF DESCRIPTION OF THE DRAWINGS

These and additional objects and advantages of the invention will become more apparent to those skilled in the art as the detailed description of the invention proceeds in conjunction with the drawings, wherein:

FIG. 4 is an enlarged perspective in partial section of the magnetic flux return path showing the winding of the discrete magnetic material wire in a direction which generally crosses the flow of magnetic flux in the motor construction; and FIGS. 5a–5e show partial cross sections of various magnetic material wire usable in the magnetic flux return path to achieve a high packing fraction in its construction.

DETAILED DESCRIPTION OF THE INVENTION

Figure 1:
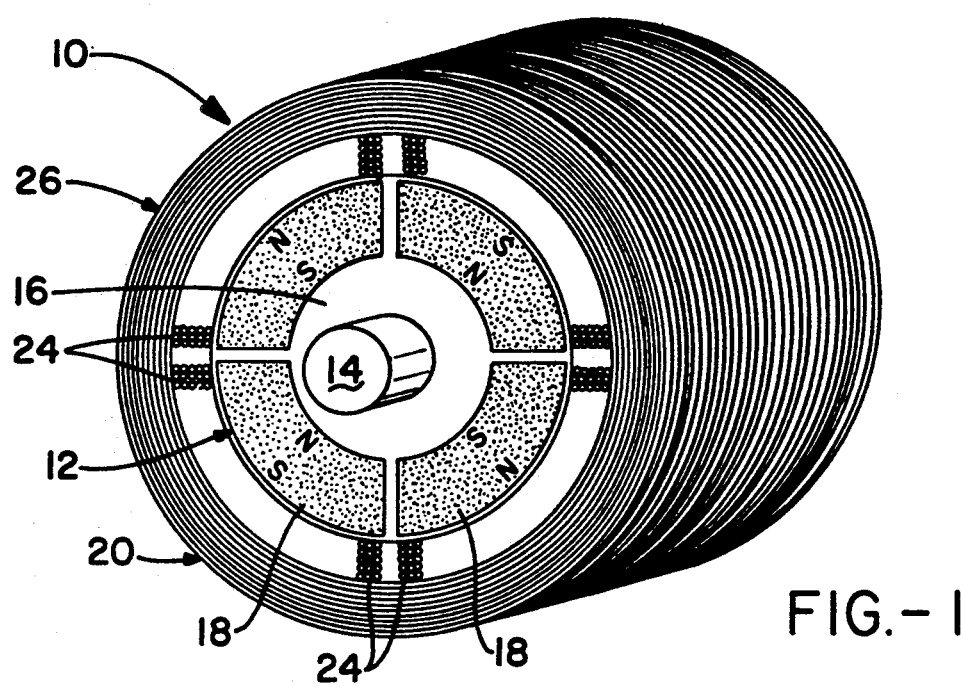
FIG. 1 is a perspective view of a DC brushless slotless motor having two pole pairs, and including a low loss magnetic flux return path.
Figure 2:
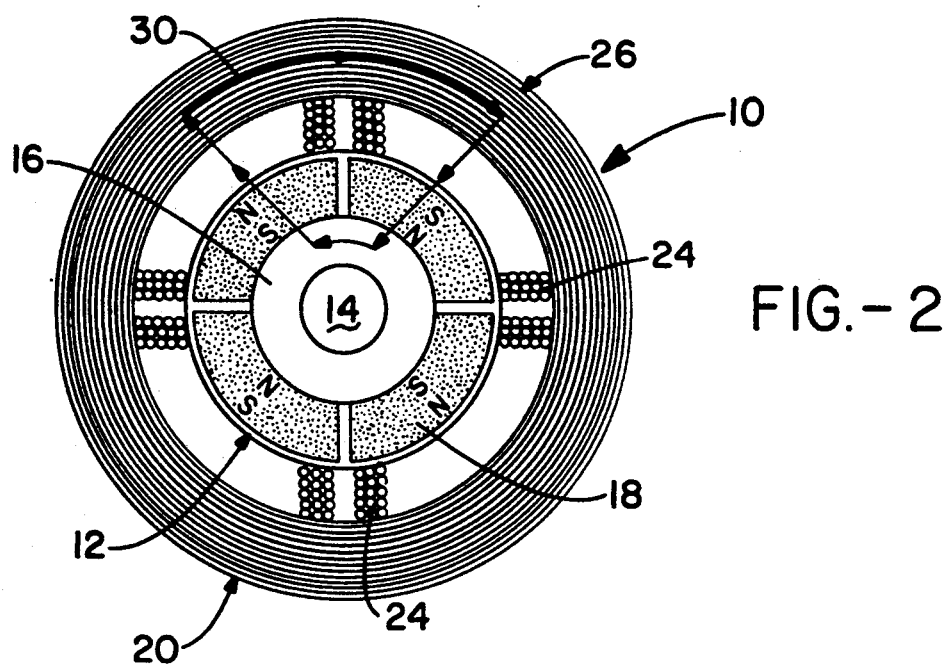
FIG. 2 is an end elevation shown in section of the motor of FIG. 1.

Turning now to FIGS. 1 and 2, a DC slotless, brushless motor 10 is shown. The motor 10 includes a cylindrically symmetric rotor 12 comprising an output shaft 14 having a soft iron fixed flux path 16 and two pole pairs of permanent magnets 18 situated on the rotor 12. The permanent magnets 18, each generate a magnetic field. The rotor 12 and output shaft 14 are supported for rotational movement within inside a concentrically wound field stator 20 by bearing means (not shown). To produce rotation of the output shaft 14, a direct current is introduced into the field windings 24 of the stator 20 to generate a magnetic field which will cause rotational movement of the rotor 12 and the permanent magnet pole pairs 18 thereof. The soft iron fixed flux path 16 provides a low reluctance path for the magnetic field generated by the permanent magnet pole pairs 18. The permanent magnets 18 may be of conventional design and are typically constructed of samarium cobalt, barium or strontium ferrite, neodymium iron or the like. The magnetic circuit of the motor 10 is completed by the addition of the magnetic flux return path 26, wherein the magnetic flux generated by the rotating magnetic field produced permanent magnet pole pairs 18 is channeled through the flux return path 26 with greatly reduced losses due to eddy currents and hysteresis.

The magnetic flux return path 26 is formed by making a multilayer winding assembly of discrete high permeability material wire. As the magnetic flux return path 26 is formed from magnetic material wire of small cross-section, it can be constructed using coil winding techniques, making fabrication easy and cost effective. The configuration of the flux return path 26 is such that losses due to eddy currents and hysteresis are minimized, which is especially apparent at high operating frequencies. The motors frequency is defined as the rotational speed times the number of pole pairs of permanent magnets in the rotor assembly 12. In this motor construction, the rotation of rotor 12 and magnets 18 will produce a fluctuating magnetic field. The flux return path 26 completes a magnetic circuit within the motor 10, to channel the fluctuating magnetic field with low losses internal to the magnetic material thereof. The low loss magnetic flux return path 26 forming part of the magnetic circuit of the motor 10 achieves very low eddy current and hysteresis losses by forming the flux path over a plurality of high permeability magnetic wires which are wrapped into layers or bundles, in a direction which generally crosses the flow of magnetic flux in the circuit. The flux return path 26 is configured to extend the length of the produced magnetic field. The flux return path 26 also has a thickness such that the material does not become magnetically saturated.

Figure 3:
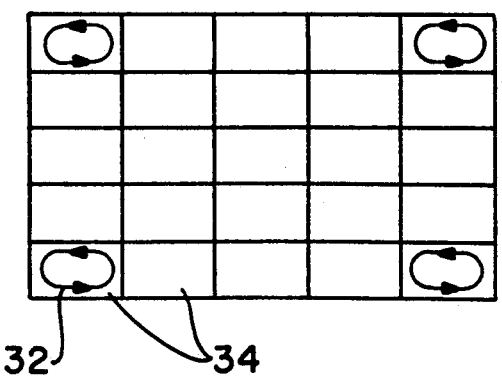
FIG. 3 is an enlarged partial sectional view of the low loss magnetic flux return path for the motor of FIG. 1.

Additionally, as compared to the conventional use of thin laminations of iron wherein the cross section to eddy currents become the cross section of the laminate edge, the magnetic flux return path 26 of the present invention reduces eddy current losses by forming the cross section to eddy currents as the cross section of the magnetic material wire thereby reducing resistive losses commonly found at the laminate edges in a conventional construction. As seen in FIG. 3, eddy currents 32 are formed in each individual magnetic flux return path element or wire 34 which make up flux return path 26. This effect can be facilitated by forming the high permeability magnetic material wires of smaller dimensional cross section to further reduce eddy current and hysteresis losses especially at high frequencies.

In the preferred embodiment, the magnetic flux return path 26 is constructed by the use of thin, flat high permeability material wire which is wrapped in a multilayer, close turn coil form. The packing fraction of the magnetic wires is very important to achieve the desired results, and allows winding of the wire in a crossing direction to the flow of flux. The flux path 26 is dimensioned to channel the entire magnetic field produced by the permanent magnets 18 situated on the output shaft 14. The expected magnetic fields produced by the permanent magnets 18 will determine the thickness of the high packing fraction magnetic flux return path 26 to prevent saturation in the flux return path. As seen in FIG. 2, the magnetic circuit 30 shows that magnetic flux from the north pole magnet is directed through the field winding 24 and into the wound magnetic flux return path 26. Once in the magnetic flux return path 26, the flux is distributed in a generally circumferential path, and then returns to the south pole magnet of the rotor 12. The magnetic circuit is completed with the solid soft iron member 16 and subsequently back into the north pole magnet as shown.

The magnetic flux produced by the rotating rotor 12 thus forms a loop from north pole into the flux return path 26 and back into the south pole. As the individual layers of high permeability wire are wrapped or wound in a direction crossing the flow of flux, it should be recognized that the individual wires must be packed with a high packing fraction. By packing the wires with high packing fraction, the winding of the wire in crossing relationship to the flow of flux has been found to significantly disturb the flux distribution or flux magnitude at of such crossings. The flux return path 26 of wound wire 12 tolerant to cross-layer and cross-winding fields is long as the packing fraction of the wire layers is high. The flux return path 26 may thus be formed by coil winding techniques which achieve a high packing fraction of the strands of wire. As merely an example, the flux return path 226 may be formed of a magnetic wire having a flat ribbon type configuration, wherein packing fractions of approximately 93% have been realized. In such a configuration, the flux return path 26 is substantially tolerant to cross-winding and cross-layer fields, so as to efficiently channel the generated flux therethrough while minimizing losses due to eddy currents. Alternatively, magnetic wire having a round configuration cannot achieve as high a packing fraction, and has an upper limitation on packing fraction of approximately $\pi/4$ or approximately 75%. The packing fraction achievable with round wire has been found to provide distinct advantages over conventional flux return path constructions, but its performance is somewhat degraded as compared to a wire configuration which will allow a greater packing fraction to be achieved.

In the motor 10, the magnetic circuit 30 as seen in FIG. 2 interacts with an opposing magnetic field produced by current flowing in the field winding 24 thereby producing a reaction torque which causes the shaft 14 to which the magnets 18 are coupled, to rotate. The soft iron core 16 to which the magnets 18 are attached experiences only a fixed magnetic flux in the motor 10, and therefore if element 16 is not magnetically saturated, there will be no motor performance loss due to hysteresis or eddy currents. It should be recognized however, that as the shaft 14 rotates, a given sector of the magnetic flux return path 26 will experience a magnetic field increase to a high value and then a decrease to zero and reverse polarity to a high value and thereafter returning to zero again, each time a magnetic pole pair rotates past a given position. This increase then decrease in magnetic flux may cause an electrical current to be generated in a magnetic flux return path material, especially in conventional laminate constructions. This current will in turn cause a power loss exhibited as heat loss. In addition, the reversing magnetic field may also produce hysteresis losses.

The wound cross section of high permeability magnetic material wire forming the magnetic flux return path 26 can significantly reduce heat losses especially in high field strength and high frequency applications. The efficiency of the magnetic circuit will depend upon the size of magnetic material wire chosen and the frequency of operation. Both hysteresis and eddy current losses are proportional to the square of the flux density. Also, hysteresis losses are proportional to the frequency of operation and eddy current losses to the square of the frequency. Additionally, eddy current losses are also proportional to the thickness of the of the individual magnetic wires used in the construction of the flux return path, and such thickness can be reduced to further reduce losses due to eddy currents. As should be recognized, the cost versus benefits of any particular flux return path construction can maximize the effectiveness of the construction in any particular motor application. The magnetic circuit return path 26 thus will reduce eddy current and hysteresis losses by better accommodating the flux generated in the circuit especially at higher field strengths and higher frequencies.

At high frequencies, losses due to skin effects may occur where lines of flux are squeezed to the outer perimeter of the flux bearing structure. As flux density in the perimeter increases towards saturation, heat losses may also increase. The use of small cross sectional wire formed into a flux bearing structure with high packing fraction, as opposed to laminates or larger diameter wire, can minimize the potential for skin effects. Additionally as the thickness of the magnetic flux return path 26 is chosen to accommodate the expected magnetic fields and prevent saturation, skin effects can be minimized.

Thus, in the design of the magnetic flux return path 26, the packing fraction of the high permeability wire is chosen to allow channeling of the magnetic flux in the cross winding configuration and the number of layers is chosen to provide a flux path of sufficient depth to prevent saturation. Similarly, the wire cross section dimensions are determined by the acceptable eddy current and hysteresis losses in the particular application for the motor 10. Due to the greater efficiency of the flux return path, very low cost materials such as very low carbon iron rather than high silicone or high nickel iron can be used. Additionally, the magnetic flux return path 26 can be manufactured easily and at a very low cost. It is important that the packing fraction of the individual wires in the layers forming the magnetic flux return path 26 be high to avoid skin effects and facilitate efficient flux distribution in the path. Standard coil winding techniques can achieve a very high packing fraction such that manufacturing can be accomplished cost effectively. Similarly, changes in size or shape requirements can also be made with little or no cost in procedures or tooling for their production.

As an example, a backiron construction formed utilizing the magnetic circuit of the present invention including a magnetic flux return path constructed of close wound magnetic material wire may be designed as follows. For a typical brushless, slotless DC motor with an output of 50 watts at 20,000 RPM, the backiron parameters may comprise a stack length should be about 1.5 inches having a diameter of about 2 inches. The backiron radial thickness would be about 0.060 inches to limit the flux density to about 1.0 T when the rotor magnets have a flux density of 0.4 T. For a wire wound backiron construction in accordance with the invention, a flat ribbon wire may be used which has dimensions of about 0.06 inches width and 0.005 inches in thickness. To accommodate the expected magnetic fields, 25 turns of flat ribbon wire per layer and 12 layers will give a backiron construction having the desired parameters. The wire wound backiron construction can be fabricated using a standard coil winding machine. For a 20,000 RPM, 2-pole pair motor having a 50 watt output, the loss associated with a backiron construction in accordance with the present invention will be about 1.88 watts or about 3.7% of the total output power. As compared with a typical motor construction using thin laminations in the construction of the backiron, an extremely significant improvement in the efficiency of the motor is achieved with a lower cost construction.

As a design consideration, the cross section of the wires making up the wound magnetic return path can be chosen for each particular application so as to operate as effectively and efficiently as possible. The skin penetration depth of the magnetic field will depend upon the particular cross section of the high permeability wire. The skin penetration depth can be found for any cross-sectional shape to optimize the design of the magnetic flux return path 26 for a particular motor application.

Turning now to FIG. 4, the windings of discrete magnetic material wire making up the flux return path are wound in a direction which generally crosses the flow of magnetic flux within the flux return path 26. For the flux return path 26 as depicted in FIG. 1, the windings of magnetic wire may be wound in a configuration which results in each wire being skewed with respect to the axis of the motor as represented by the output shaft 14. As an example, the multiple layers of magnetic material wire may be wound in a first direction as represented by layer 38, wherein each wire is generally oriented in a direction which crosses the flow of magnetic flux within the windings, as shown by the arrows 36. This configuration may be formed by helically winding the magnetic material wire over the expected length of the magnetic fields produced in a particular application. The next layer of magnetic material wire 40 may also be formed by helically winding the wire over the layer 38, although in a direction opposite to that of layer 38 such that the wires of layer 40 are also oriented in a direction crossing the flow of magnetic flux 36, as well as crossing the orientation of the wires in layer 38. Thus each of the discrete magnetic material wires is wound in a direction which generally crosses the flow of flux within the return path 26, wherein the long dimension of the wire is not oriented along the direction of the flow of flux.

In the configuration of the magnetic flux return path, it should be recognized that various winding configurations can be used wherein the magnetic material wire will generally cross the flow of flux in the return path. It should also be recognized that in the configuration shown in FIG. 4, or in another configuration, the magnetic material wire may be wound in a manner to achieve a high packing fraction as desired. Due to the high packing fraction with which the discrete wires are positioned, the flux return path will be substantially tolerant of cross-layer and cross-winding fields. In this way, the individual windings are able to be wound in a crossing direction with respect to the flow of flux through the return path as represented by the arrow 36 in FIG. 4. The flux return path 26 is tolerant to cross-winding or cross-layer fields as the flow of flux within the return path is not disturbed. The magnetic circuit, completed by the flux return path, is able to efficiently channel the generated flux as the effect of the crossing magnetic material wire will be a field effect and not a flow effect. In this way the crossing direction of the magnetic material wires will not significantly disturb the flux distribution or magnitude within the flux return path.

As seen in FIGS. 5a–5e, the windings or layers of high permeability magnetic material wire can be constructed of any wire geometry such as, but not limited to, square cross section as seen in FIG. 5a, round as seen in FIG. 5b, triangular and seen in FIG. 5c, oval as seen in FIG. 5d or flat or ribboned as seen in FIG. 5e. It should be recognized that the various cross sections of wire may allow greater packing fraction to be achieved using standard coil winding techniques. It should also be recognized that combinations of various cross sections may be used as desired. In some applications, an oxide coating on a bare wire may be adequate to provide contact resistance to eddy current circulation or a thin non-conductive coating on the wire may be used. The particular cross-section or combination utilized must only take into account the desired core permeability, which is dependent upon the packing factor and the material permeability itself. Thus, the particular packing fraction achievable with any particular cross section or winding technique must be taken into consideration when determining the overall volume to saturation of the magnetic flux return path.

The present invention has thus been shown to provide an efficient and cost effective magnetic flux return path assembly which provides great flexibility in the design and fabrication thereof. The wire wound magnetic flux return path may be used in lieu of laminations and will reduce the eddy current and hysteresis losses as well as minimize skin effects while reducing power consumption in the application. By utilizing discrete wires wound in a direction generally crossing the flow of magnetic flux, the construction is simplified and yet the desired results are achieved. The number of windings and layers of wires can be easily chosen to accommodate the proper flux density to avoid magnetic saturation in the device. The dimensions of wire can be chosen based upon the flux density and frequency of the application and does not require directional characteristics due to flow effects as this magnetic flux return path relies upon field effects. Although various specific embodiments using the magnetic flux return path of the invention have been set forth, it should be recognized that the flux return path may be utilized in other applications and various modifications and variations are possible and contemplated within the scope of the appended claims.

What is claimed is

1. An electric motor having a low loss magnetic flux return path comprising,
   a permanent magnet rotor including an output shaft rotatably supported on bearing means,
   a stator including field windings positioned around said rotor, wherein an electric current is introduced into said field windings to selectively energize said field windings and generate magnetic fields acting on said permanent magnet rotor to induce rotation of said output shaft,
   a return yoke member associated with said rotor and constructed of a soft magnetic material to provide a fixed flux path for the magnetic flux generated by said permanent magnet rotor, and
   a flux return path positioned around said field windings and having a cross-section characterized as a plurality of discrete high permeability magnetic wires, said magnetic wires being wound in a direction generally crossing the flow of magnetic flux generated by said permanent magnet rotor, said plurality of discrete wires being packed with high packing fraction sufficient to result in said flux return path being tolerant to cross-layer and cross-winding magnetic fields generated at the location of the crossing magnetic flux, said flux return path forming a body of high permeability magnetic material surrounding said field windings and extending approximately the length of the magnetic field generated by the rotating permanent magnets associated with said rotor, with the thickness of said body of high permeability magnetic material dimensioned to fully accommodate the generated magnetic fields,
   wherein said discrete windings forming said flux return path minimize losses due to eddy currents and hysteresis and the thickness of said flux return path will minimize losses due to magnetic saturation.

2. The electric motor of claim 1, wherein,
   the dimensions of said magnetic material wire provide a small cross-sectional area which enables said plurality of windings to be positioned in a very close packed configuration such that the penetration depth of the magnetic flux is limited to within said plurality of windings.

3. The electric motor of claim 1, wherein,
   eddy currents generated and circulating within said magnetic flux return path are carried by each of said discrete windings of magnetic material wire to minimize losses due to eddy currents.

4. The electric motor of claim 1, wherein,
   said magnetic material wire is formed of a high magnetic permeability material.

5. The electric motor of claim 1, wherein,
   said return path is constructed of a plurality of layers formed from said plurality of windings in a closely packed configuration and the thickness of said plurality of layers is chosen to minimize skin effects and to limit the flux density of the generated alternating magnetic fields from said rotating permanent magnet rotor to below the magnetic saturation level of said magnetic material.

6. The electric motor of claim 1, wherein,
   said magnetic material wire has a cross sectional geometry which allows a high packing fraction to be obtained in said at least one layer of said discrete windings.

7. The electric motor of claim 1, wherein,
   the cross section to eddy current circulation within said magnetic flux return path is the cross section of each of said discrete windings of magnetic material wire.

8. The electric motor of claim 1, wherein
   said plurality of discrete windings are formed from low carbon iron.

9. The electric motor of claim 1, wherein,
   said plurality of discrete windings of magnetic material wire have a circular cross-sectional configuration, wherein each of said discrete windings of magnetic material wire are positioned in closely adjacent relationship to one another.

10. The electric motor of claim 1, wherein, said plurality of discrete windings of magnetic material wire have a non-circular geometric cross-sectional configuration which allows said plurality of windings to be packed in said high packing fraction.

11. The electric motor of claim 10, wherein said non-circular geometric cross-sectional configuration of said magnetic material wire comprises a rectilinear geometric cross-sectional configuration wherein each of said discrete windings may be positioned such that sides of the rectilinear configuration will lie directly adjacent to a side of an adjacent winding of magnetic material wire to obtain said high packing fraction.

12. The electric motor of claim 11, wherein said rectilinear cross-sectional configuration is formed as a flat ribbon of magnetic material wire.

13. The electric motor of claim 10, wherein, said non-circular geometric cross-sectional configuration of said magnetic material wire comprises a triangular geometric cross-sectional configuration wherein at least two sides of each of said triangular magnetic material wires are positioned directly adjacent to another side of an adjacent winding of magnetic material wire to obtain said high packing fraction.

14. The electric motor of claim 10, wherein, said non-circular geometric cross-sectional configuration of said magnetic material wire comprises an oval cross-sectional configuration, wherein each of said discrete windings of magnetic material wire are positioned directly adjacent to another winding of magnetic material wire to obtain said high packing fraction.

15. The electric motor of claim 1, wherein, said motor generates alternating magnetic fields at high frequencies and said cross-sectional configuration of discrete windings each provide a small cross-section of wire to eddy currents and said high packing fraction minimizes skin effects associate with said high frequency alternating magnetic fields.

16. The electric motor of claim 1, wherein, said plurality of discrete windings formed into one or more layers of high permeability are designed to have a width and thickness so as to have core magnetic permeability flux density below the level of magnetic saturation of said magnetic material forming said windings.

17. The electric motor of claim 1, wherein, said plurality of discrete windings formed into one or more layers of high permeability magnetic material are formed by standard coil winding techniques, whereby the geometric cross-sectional configuration of said windings allows said windings to be packed with said high packing fraction using said coil winding techniques.

* * * * *